(12) United States Patent
Brown

(10) Patent No.: US 8,573,542 B2
(45) Date of Patent: Nov. 5, 2013

(54) AEROFOIL SLOT BLOWING

(75) Inventor: James Brown, Bristol (GB)

(73) Assignee: Airbus Operations Limited, Bristol (GB)

( * ) Notice: Subject to any disclaimer, the term of this patent is extended or adjusted under 35 U.S.C. 154(b) by 275 days.

(21) Appl. No.: 12/855,793

(22) Filed: Aug. 13, 2010

(65) Prior Publication Data

US 2011/0049304 A1 Mar. 3, 2011

(30) Foreign Application Priority Data

Aug. 26, 2009 (GB) .................................. 0914838.8

(51) Int. Cl.
*B64C 3/00* (2006.01)
(52) U.S. Cl.
USPC .......................................... 244/207; 244/206
(58) Field of Classification Search
USPC .................................................. 244/207, 194
See application file for complete search history.

(56) References Cited

U.S. PATENT DOCUMENTS

| | | | | |
|---|---|---|---|---|
| 1,843,993 | A | * | 2/1932 | Stalker ........................... 244/208 |
| 2,885,160 | A | * | 5/1959 | Griswold, II .................. 244/207 |
| 4,285,482 | A | | 8/1981 | Lewis |
| 6,109,565 | A | * | 8/2000 | King, Sr. ........................ 244/207 |
| 6,334,753 | B1 | | 1/2002 | Tillman et al. |

FOREIGN PATENT DOCUMENTS

| | | |
|---|---|---|
| DE | 10201966 A1 | 7/2003 |
| GB | 792243 A | 3/1958 |
| RU | 2282563 C2 | 8/2006 |
| WO | 88/10210 A1 | 12/1988 |

OTHER PUBLICATIONS

British Search Report dated Dec. 23, 2009.
Rudnik R et al, The European High Lift Project Eurolift II—Objectives, Approach, and Structure, 2007, pp. 1-15, 25th AIAA 2007-4296.

* cited by examiner

*Primary Examiner* — Christopher P Ellis
*Assistant Examiner* — Medhat Badawi
(74) *Attorney, Agent, or Firm* — Lowe Hauptman & Ham, LLP

(57) ABSTRACT

An aerofoil defining geometric upper and lower surfaces which together form a leading edge region and a trailing edge region, and comprising a blowing device having a slot in the lower geometric surface in the leading edge region for injecting fluid into the airflow over the aerofoil, wherein the slot is located forward of the leading edge stagnation point at the critical angle of incidence of the aerofoil, and wherein the blowing device is adapted to inject the fluid forwardly of the slot and substantially parallel to the lower surface. Also, a method of improving the performance of the aerofoil by injecting fluid into the airflow over the aerofoil from the slot. The upper surface of the aerofoil can be kept clean, giving the potential for laminar flow during cruise without significantly compromising the high lift performance of a blown leading edge at high incidence.

13 Claims, 1 Drawing Sheet

AEROFOIL SLOT BLOWING

RELATED APPLICATIONS

The present application is based on, and claims priority from, British Application Number GB0914838.8, filed Aug. 26, 2009, the disclosure of which is hereby incorporated by reference herein in its entirety.

FIELD OF THE INVENTION

The present invention relates to an aerofoil having a blowing slot in its leading edge for injecting fluid into the airflow over the aerofoil.

BACKGROUND OF THE INVENTION

An aerofoil is a streamlined body that generates lift when moved relative to the surrounding air. Aerofoils, such as aircraft wings and horizontal tailplanes, have upper and lower geometric surfaces which together form a leading edge region and a trailing edge region.

To improve the lift performance of the aerofoil at high angles of attack, various leading edge high lift devices, such as slats and flaps, have been developed. Many aircraft have slats mounted to the wing fixed leading edge, which are deployed forwardly during take-off and landing to increase the lift coefficient of the wing. They are typically retracted during cruise to reduce drag. High lift devices increase payload and performance during take-off and landing, which gives rise to significant efficiencies for the aircraft flight as a whole. However, leading edge slats are becoming one of the greatest sources of aircraft noise during the landing phase.

A conventional aerofoil has an interrupted boundary layer at high speeds, leading to turbulent flow over the remainder of the aerofoil. This turbulent flow increases drag. A laminar aerofoil has an uninterrupted boundary layer over a much greater proportion of the aerofoil, leading to laminar flow over most of the aerofoil (typically up to around 75% of chord). This laminar flow reduces drag, and hence fuel consumption and $CO_2$ emissions during cruise.

Laminar aerofoils require "clean" (smooth) leading edge profiles, which conflict with traditional high lift devices, such as slats. Improvements in emissions and noise reduction are two of the most important factors influencing future aircraft design, and the interrelation between high lift devices and laminar aerofoils is of particular interest.

Recent tests have shown ["The European High Lift Project EUROLIFT II-Objectives, Approach, and Structure", R. Rudnik et al., $25^{th}$ AIAA 2007-4296] that active slot blowing at the leading edge of an aircraft wing can recover a significant proportion of the performance of a slat. It is seen that up to around 70% of the high lift performance of a deployed slat can be recovered using an active continuous blowing slot.

Leading edge slot blowing has been considered in the aviation industry for many years. Slot blowing involves injecting a pressurized fluid (air) into the airflow over the aerofoil when at high angles of incidence. The slot is adapted to direct the injected fluid substantially parallel to the local surface of the aerofoil. Slot blowing energizes the boundary layer, which promotes boundary layer attachment and delays or prevents the onset of free stream flow separation. The energized boundary layer takes a fuller profile and becomes turbulent, if not already.

Prior art slot blowing investigated in the above reference to Rudnik et al. uses a spanwise slot in the upper geometric surface of the aerofoil forward (upstream) of the expected high incidence separation point. Fluid is injected into the airflow over the aerofoil in a chordwise direction from the slot towards the trailing edge. FIG. 1 shows a schematic cross section view of the aerofoil including a leading edge slot blowing device.

As can be seen from FIG. 1, the aerofoil 1 has upper and lower geometric surfaces 2, 3 on either side of the chord line 4 and which together form a leading edge region 5. Behind the leading edge region 5 is a blowing device 6. The blowing device 6 includes a piccolo tube 7 which carries a supply of high pressure air in the spanwise direction behind the leading edge. The piccolo tube 7 expels the high pressure air radially into a cavity 8, which is shaped to accelerate the air through a slot 9 extending spanwise across the upper surface 2. The slot 9 injects the air substantially parallel to the upper surface 2 in a chordwise direction towards the trailing edge, entraining the boundary layer.

Although the arrangement shown in FIG. 1 works adequately to improve the performance of the aerofoil (e.g., greater lift, later stall, and lower drag) to provide up to around 70% of the performance of a leading edge slat, the presence of the slot 9 in the upper surface 2 causes an aerodynamic step. This is undesirable for a laminar aerofoil, as the step in the leading edge region 5 will trip the laminar boundary layer when the aerofoil is at low angles of incidence, such as during cruise.

SUMMARY OF THE INVENTION

A first aspect of the invention provides an aerofoil defining geometric upper and lower surfaces which together form a leading edge region and a trailing edge region, and comprising a blowing device having a slot in the lower geometric surface in the leading edge region for injecting fluid into the airflow over the aerofoil, wherein the slot is located forward of the leading edge stagnation point at the critical angle of incidence of the aerofoil, and wherein the blowing device is adapted to inject the fluid forwardly from the slot and substantially parallel to the lower surface.

A further aspect of the invention provides a method of improving the performance of an aerofoil defining geometric upper and lower surfaces which together form a leading edge region and a trailing edge region, the method comprising injecting fluid into the airflow over the aerofoil from a slot in the lower geometric surface, which is located forward of the leading edge stagnation point at the critical angle of incidence of the aerofoil, the fluid being injected into the airflow in a forward direction from the slot and substantially parallel to the lower surface.

The invention is advantageous in that the blown slot can entrain (energise) the boundary layer to keep it attached so as to provide high lift performance when the aerofoil is at high incidence. By providing the blown slot on the lower geometric surface, the upper surface of the aerofoil can be kept "clean", i.e. free of aerodynamic steps, giving the potential for laminar flow during cruise.

In a preferred embodiment, the blowing device is adapted to inject the fluid from the slot and around the leading edge region towards the upper surface of the trailing edge region. This entrains the boundary layer around the leading edge. Positioning the slot forward of the leading edge stagnation point at the critical angle of incidence ensures the fluid follows a path around the leading edge when the blowing device is activated at high incidence. The blowing device is generally not activated at low incidence.

The blowing slot is preferably located on the high pressure surface of the aerofoil when the aerofoil is at low incidence (no blowing) and on the low pressure surface of the aerofoil when the aerofoil is at high incidence (with blowing). Preferably, fluid is injected into the airflow only when the slot is forward of the incident leading edge stagnation point.

The slot preferably extends spanwise across the leading edge region. The slot preferably has a width of small dimension, less than 1 mm, and most preferably less than 0.3 mm. The size of the slot is only limited by manufacturing tolerances. The effectiveness of the blowing slot is improved by decreasing the slot width and/or increasing the velocity of the fluid injected into the airflow.

Preferably, the aerofoil is a laminar aerofoil, and the upper surface profile is free from aerodynamic steps.

The aerofoil may be an aircraft wing or horizontal tailplane.

The fluid is preferably air, and most preferably is high pressure air, which may be bled from the compressor stage of an aircraft engine.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
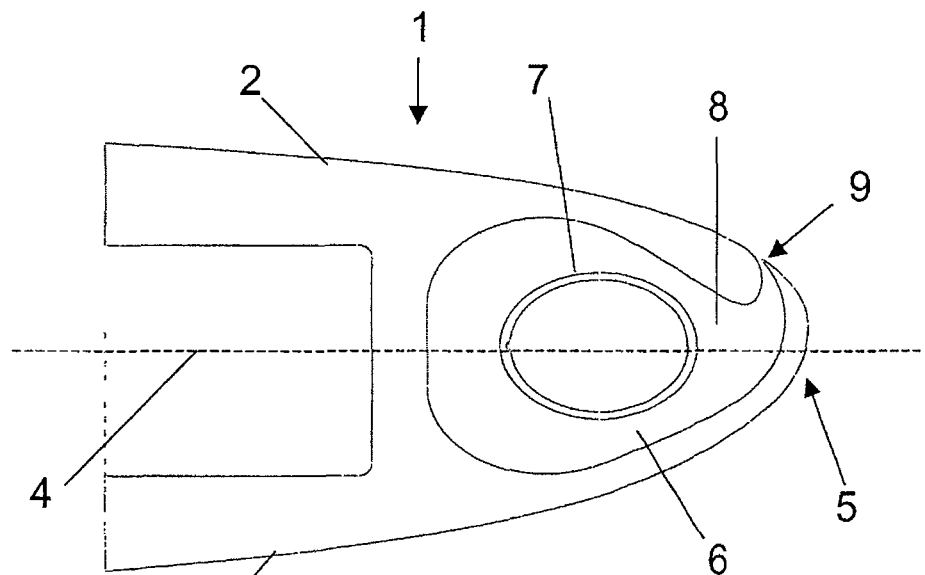
FIG. 1 shows schematically a cross section view of a prior art aerofoil leading edge having a blowing slot in its upper surface.
Figure 2:
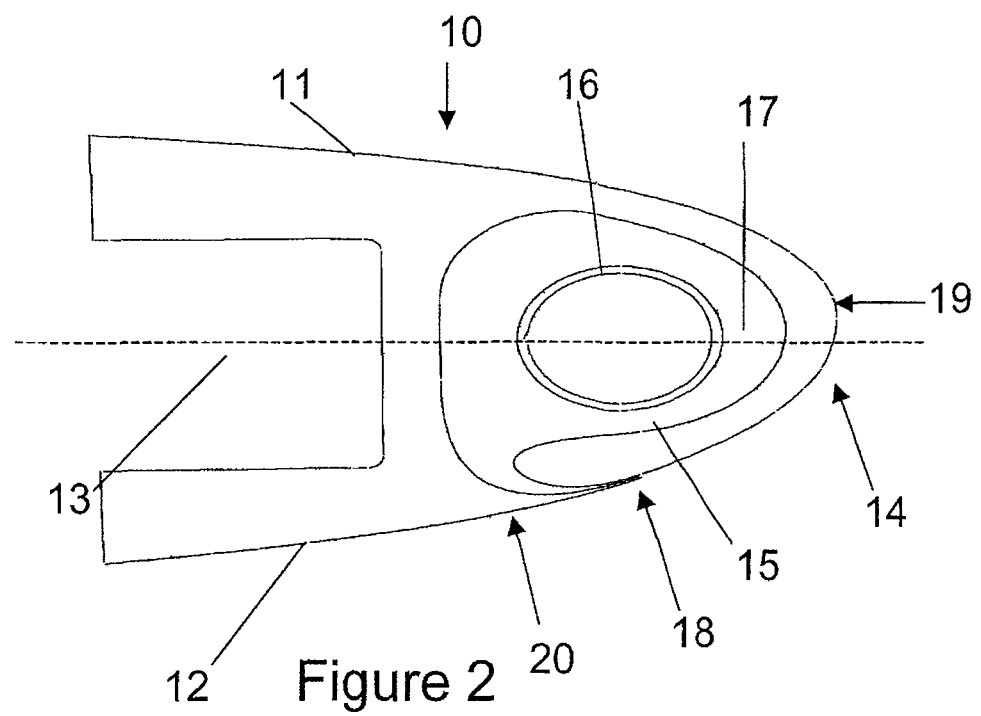
FIG. 2 shows schematically a cross section view of an aerofoil leading edge in accordance with this invention having a blowing slot in its lower surface.

FIG. 2 shows a schematic cross section view of an aerofoil leading edge including a leading edge slot blowing device. As can be seen from FIG. 2, the aerofoil 10 has upper and lower geometric surfaces 11, 12 on either side of the chord line 13 and which together form a leading edge region 14. The upper and lower surfaces also meet to form a trailing edge region (not shown). Behind the leading edge region 14 is a blowing device 15. The blowing device 15 includes a piccolo tube 16 which carries a supply of high pressure air in the spanwise direction behind the leading edge. The piccolo tube 16 expels the high pressure air radially into a cavity 17, which is shaped to accelerate the air through a slot 18 extending spanwise across the lower surface 12.

The blowing device 15, when activated, injects the air into the airflow over the aerofoil 10 forwardly from the slot 18, substantially parallel to the lower surface 12, and around the leading edge region 14 in a chordwise direction towards the upper surface of the trailing edge region (not shown).

The blowing device 15 is typically only activated when the slot 18 is forward of the incident leading edge stagnation point. The low incidence (cruise) and high incidence (landing) stagnation points 19,20 respectively are indicated in FIG. 2. The blowing device 15 is therefore generally not activated at low incidence. Accordingly, the slot 18 is located on the high pressure (lower aerodynamic) surface of the aerofoil 10 when the aerofoil is at low incidence (no blowing) and on the low pressure (upper aerodynamic) surface of the aerofoil when the aerofoil is at high incidence (with blowing).

The aerofoil 10 is a laminar aerofoil and has a "clean" upper surface 11 free from aerodynamic steps. This enables the aerofoil 10 to operate with laminar flow over up to around 75% of chord during high speed cruise, which gives a significant reduction in drag and hence fuel burn. The pressure gradient on the lower surface 12 during cruise is sufficient to maintain attachment of the boundary layer on the lower surface, despite the presence of the slot 18.

The effectiveness of the slot blowing is improved by decreasing the width of the slot 18 (perpendicular to its spanwise extent), and/or increasing the mass flow rate of the fluid injected into the airflow. To that end, the width of the slot 18 should be less than 1 mm and preferably less than 0.3 mm. The slot size is only limited by manufacturing capabilities. The mass flow rate of the fluid injected into the airflow can be increased by increasing the pressure of the air in the piccolo tube 16.

Locating the blowing slot on the lower surface rather than the upper surface reduces the effectiveness of the blowing device. Typically, it has been found that blowing from the lower surface is around 50% as effective as blowing from the upper surface, when comparing the improvement in lift coefficient from slot blowing. This loss can be recovered by increasing the mass flow rate through the slot. Where the aerofoil 10 is an aircraft wing or horizontal tailplane, the high pressure air feeding the blowing device can be bled from the compressor stage of an engine of the aircraft. Whilst blowing from the lower surface will require a greater draw of high pressure air from the engine, resulting in a slight increase in fuel burn, it is expected that this will be more than offset by the reduction in fuel burn due to the reduction in drag of the laminar aerofoil during cruise.

Although the invention has been described above with reference to one or more preferred embodiments, it will be appreciated that various changes or modifications may be made without departing from the scope of the invention as defined in the appended claims.

The invention claimed is:

1. An aerofoil defining geometric upper and lower surfaces which together form a leading edge region and a trailing edge region, and comprising a blowing device having a slot in the lower geometric surface in the leading edge region for injecting fluid into the airflow over the aerofoil, wherein the slot is located forward of the leading edge stagnation point at the critical angle of incidence of the aerofoil, and wherein the blowing device is adapted to inject the fluid forwardly from the slot and substantially parallel to the lower surface, wherein the slot extends spanwise across the leading edge region and has a slot width, the slot width being less than 1 mm.

2. An aerofoil according to claim 1, wherein the blowing device is adapted to inject the fluid from the slot and around the leading edge region towards the upper surface of the trailing edge region.

3. An aerofoil according to claim 1, wherein the slot width is less than 0.3 mm.

4. An aerofoil according to claim 1, wherein the aerofoil is a laminar aerofoil.

5. An aerofoil according to claim 1, wherein the upper surface profile is free from steps.

6. An aerofoil according to claim 1, wherein the aerofoil is an aircraft wing or horizontal tailplane.

7. A method of improving the performance of an aerofoil defining geometric upper and lower surfaces which together form a leading edge region and a trailing edge region, the method comprising injecting fluid into the airflow over the aerofoil from a slot in the lower geometric surface, which is located forward of the leading edge stagnation point at the critical angle of incidence of the aerofoil, the fluid being injected into the airflow in a forward direction from the slot and substantially parallel to the lower surface, wherein the slot extends spanwise across the leading edge region and has a slot width, the slot width being less than 1 mm.

8. A method according to claim 7, wherein the fluid is injected into the airflow only when the slot is forward of the incident leading edge stagnation point.

9. A method according to claim 7, wherein the fluid is injected from the slot and around the leading edge region towards the upper surface of the trailing edge region.

10. A method according to claim 7, wherein the aerofoil is an aircraft wing or horizontal tailplane.

11. A method according to claim 10, wherein the injected fluid is bleed air from an engine of the aircraft.

12. An aerofoil according to claim 1, wherein the blowing device includes a cavity behind the leading edge region extending in a spanwise direction of the aerofoil and a fluid source adapted to carry a fluid in the spanwise direction of the aerofoil within the cavity; wherein the blowing device is adapted to expel the fluid from the fluid source substantially radially into the cavity, and wherein the cavity is shaped to accelerate the fluid through the slot.

13. A method according to claim 7, the method further comprising: carrying the fluid in the spanwise direction of the aerofoil in a fluid source within a cavity extending in the spanwise direction behind the leading edge region; expelling the fluid from the fluid source substantially radially into the cavity, and using the shape of the cavity to accelerate the fluid through the slot in the lower geometric surface in the leading edge region.

* * * * *